(12) United States Patent
Nave et al.

(10) Patent No.: US 7,839,601 B2
(45) Date of Patent: Nov. 23, 2010

(54) METHOD AND APPARATUS FOR EASY SPRING REPLACEMENT IN A DEEP SLOT STORAGE LIBRARY

(75) Inventors: Shawn M. Nave, Tucson, AZ (US); Jeffrey L. Thorn, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 11/619,259

(22) Filed: Jan. 3, 2007

(65) Prior Publication Data

US 2008/0157446 A1 Jul. 3, 2008

(51) Int. Cl.
*G11B 15/60* (2006.01)
*G11B 15/68* (2006.01)

(52) U.S. Cl. .................................................. 360/92.1
(58) Field of Classification Search .................. 360/92, 360/92.1, 96.51
See application file for complete search history.

(56) References Cited

U.S. PATENT DOCUMENTS

| | | | | |
|---|---|---|---|---|
| 5,781,367 | A * | 7/1998 | Searle et al. ................ | 360/92.1 |
| 6,332,288 | B1 * | 12/2001 | Guillemet et al. ............. | 49/181 |
| 6,357,606 | B1 * | 3/2002 | Henry ....................... | 211/59.3 |
| 6,781,789 | B2 | 8/2004 | Ostwald | |
| 7,424,957 | B1 * | 9/2008 | Luberto ..................... | 211/59.3 |
| 2007/0230036 | A1 * | 10/2007 | Nave et al. .................... | 360/92 |
| 2009/0040653 | A1 * | 2/2009 | Green et al. .................. | 360/91 |

OTHER PUBLICATIONS

Nave, et al. "A Deep Storage Slot With a Constant Spring Force". U.S. Appl. No. 11/393,497, filed Mar. 30, 2006. 14 pages.
Charmorro, et al. "Management of Data Cartridges in Multiple-Cartridge Cells in an Automated Data Storage Library". U.S. Appl. No. 11/374,504, filed Mar. 13, 2006. 21 pages.
Nave. "Cartridge Retention in an Automated Data Storage Library". U.S. Appl. No. 11/373,963, filed Mar. 13, 2006. 22 pages.
Karidis, et al. "Data Storage Cartridge Gripper With Deep-Reach". U.S. Appl. No. 11/374,190, filed Mar. 13, 2006. 24 pages.

* cited by examiner

*Primary Examiner*—Jefferson Evans
(74) *Attorney, Agent, or Firm*—Cantor Colburn LLP; Jennifer Anda

(57) ABSTRACT

A deep slot tape cartridge library module including a main wall having two major surfaces; a pair of side walls in spaced relation to each other and each extending orthogonally to both major surfaces whereby the main wall and side walls form a substantially "H" shaped structure; an opening in the main wall, the opening extending longitudinally along the main wall a relatively short distance; a spring clip configured complimentarily to the opening and removably retainable therein; and a spring fixedly connected to the spring clip. A method for replacing a spring of a high density tape library where a spring assembly and main wall are utilized, the method including identifying a slot having a failed spring; emptying the identified slot of tape cartridges; extracting the spring assembly from the main wall; and replacing the spring assembly with a non-failed spring assembly.

4 Claims, 2 Drawing Sheets

METHOD AND APPARATUS FOR EASY SPRING REPLACEMENT IN A DEEP SLOT STORAGE LIBRARY

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Increasing storage density and capacity in an automated tape libraries can be achieved by stacking individual tape cartridges, one behind the other in the same slot of a deep slot library frame. In order for such frames to function appropriately with library robotic accessors, cartridges must each automatically be positioned at the opening of individual slots regardless of the number of cartridges in the slot at any given time.

One particular mechanism utilized to ensure the requirement just noted is a constant force spring positioned at each of the slots. While such springs do indeed work well for their intended purpose, they do eventually require replacement since springs, in general, are not unlimited cycle structures. A problem is encountered in that each constant force spring is a permanent component of each slot, the slots being formed by stackable structures of the library frame. Therefore, when a spring requires replacement, the structure forming the slot must be replaced therewith. Because the slot structures all interlock, an entire stack of slot structures upwardly (or downwardly) adjacent the failed slot must be removed to access the failed slot. This is a time consuming and inefficient by product of the high-density storage library concept. What is needed therefore is a method and apparatus that increases efficiency in the replacement of springs.

FIELD OF THE INVENTION

This invention relates to deep slot library frames, and particularly to a method and apparatus for easy spring replacement in a deep slot storage library.

SUMMARY OF THE INVENTION

A deep slot tape cartridge library module including a main wall having two major surfaces; a pair of side walls in spaced relation to each other and each extending orthogonally to both major surfaces whereby the main wall and side walls form a shape capable of being stacked to create deep slots; an opening in the main wall, the opening extending longitudinally along the main wall a relatively short distance; a spring clip configured complimentarily to the opening and removably retainable therein; and a spring fixedly connected to the spring clip.

A method for replacing a spring of a high density tape library where a spring assembly and main wall are utilized, the method including identifying a slot having a failed spring; emptying the identified slot of tape cartridges; extracting the spring assembly from the main wall; and replacing the spring assembly with a non-failed spring assembly.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
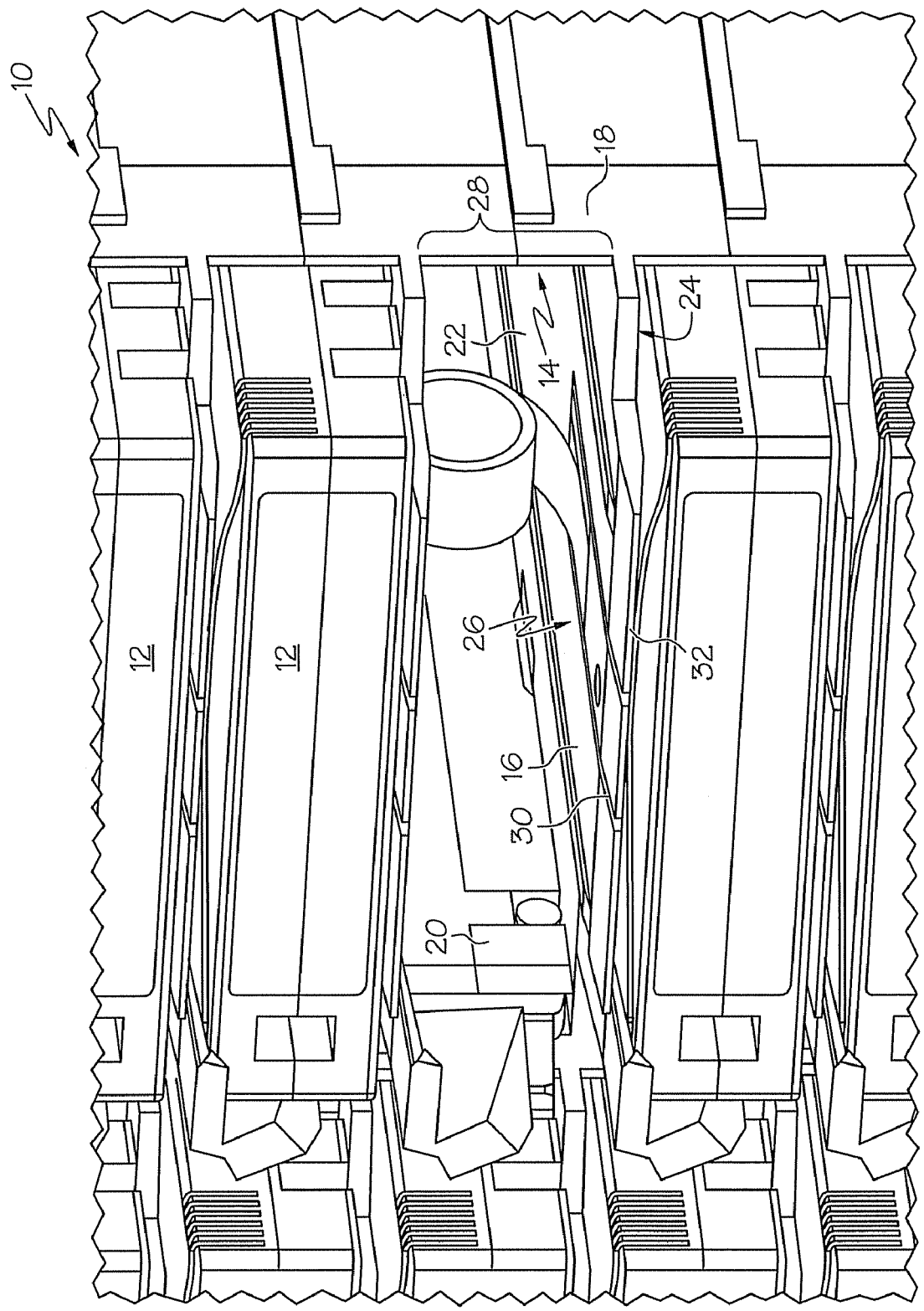
FIG. 1 is a perspective view of a deep slot tape library frame showing a constant force spring assembly in one slot.

Referring to FIG. 1, a library frame 10 is illustrated to provide environment for the spring assembly disclosed herein. A number of tape cartridges 12 are illustrated in place within deep slots of the frame 10 and a single deep slot 14 is shown without any tape cartridge therein. For purposes of clarity, the slot 14 includes a main wall 16 and side walls 18 and 20. It will be appreciated from FIG. 1 that slots 14 are created by stacking individual units having the main wall 16 and side walls 18 and 20, the walls extending from each major surface 22 and 24 of each main wall 16. Main walls 16 therefore act as both "roof" and "floor" of adjacent slots 14. A spring assembly 26 is to be located in the main wall 16 adjacent a slot opening 28 for each slot that will have a spring (typically all slots). In order to accommodate spring assembly 26, a specifically configured opening 30 in main wall 16 is provided. Such is termed herein a library module. As is apparent in FIG. 1, opening 30 begins at an edge 32 of main wall 16 and extends longitudinally along main wall 16 a relatively short distance. The opening 30 includes features that are complementary to portions of the spring assembly 26 and discussed in more detail hereunder.

Figure 2:
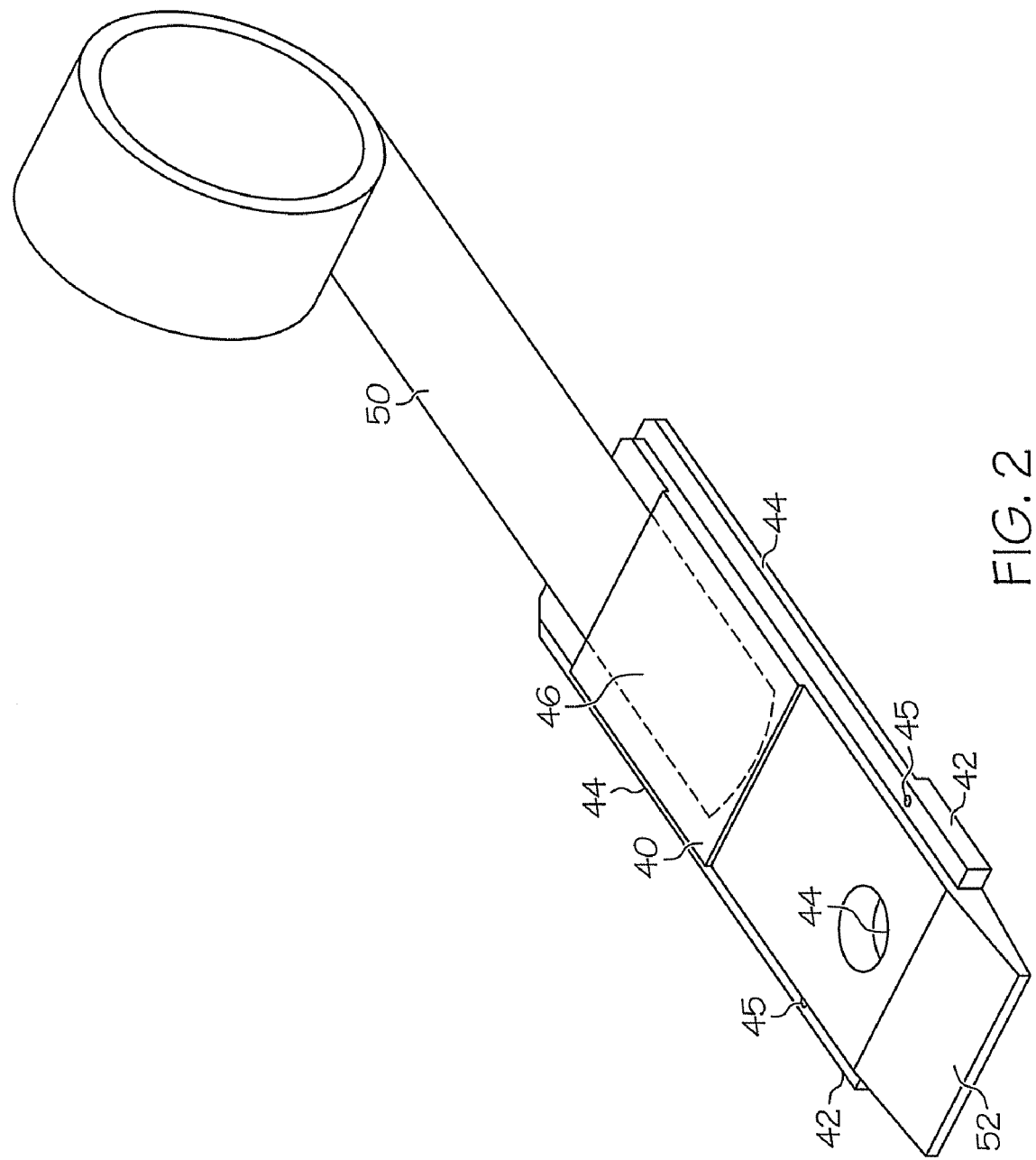
FIG. 2 is an enlarged perspective view of a constant force spring assembly.

Spring assembly 26, referring to FIG. 2, comprises a spring clip 40 and a spring 50. Spring clip 40 is of substantially identical size and shape to opening 30 and is intended to be removably received and retained in opening 30. Facilitating this intent are at least one, and in this embodiment a pair of stop features 42 extending from slides 44. Further detents 45 are provided to facilitate "snap-in/snap-out" operation of the spring assembly 26 and are communicative with the stop features such that the stop features 42 land against main wall 16 at the same time that detents 45 find complementary features (not shown) in main wall 16. The detents 45 are not intended to permanently engage main wall 16 but rather to provide reliable retention of spring clip 26 to main wall 16 while still allowing relatively easy removal thereof where intent to remove is made evident by actions taken by maintenance personnel. Slides 44 are simultaneously receivable in grooves (not shown) in main wall 16 that extend into the material of main wall 16 from the opening 30 and are complementary in shape and dimension to slides 44 as shown. The stop features 42 do not fit into the grooves and thus stop movement of the spring clip 26 when the features 42 make contact with the wall. The clip is held in place by the detents and the natural action of the spring shown.

Spring clip 40 further includes in one embodiment, and as illustrated, a disengagement hole 44. Hole 44 provides a "purchase" location allowing maintenance personnel to more easily remove clip 40, and thereby the whole of spring assembly 26 by simply extending a tool through hole 44 and pulling on the tool. A tool with a hook like structure is particularly helpful in extracting the spring assembly 26 from the main wall 16.

Further, spring clip 40 includes a mounting feature 46 for the spring 50. In one embodiment, feature 46 is a post to physically retain spring 50 and in another embodiment feature 46 is an overmold feature (shown) of the clip 40, which bonds spring 50 to clip 40. Spring 50 itself is as noted above a constant force spring, as illustrated. It will be appreciated that clip 40 further includes a ramped surface 52 to match main wall 16 thus facilitating tape insertion.

The method for replacing a spring of a high density tape library where a spring assembly 26 and main wall 16 are utilized comprises identifying a slot 14 having a failed spring 50; emptying the identified slot 14 of tape cartridges 12; extracting the spring assembly from the main wall 16; and replacing the spring assembly 26 with a non-failed spring assembly.

The method hereof and the underlying apparatus dramatically improves efficiency of maintenance of a high density tape cartridge library.

What is claimed is:

1. A deep slot tape cartridge library module comprising:
a first main wall having two major surfaces;
a pair of side walls in spaced relation to each other and each extending orthogonally to both major surfaces whereby the first main wall and side walls form a shape capable of creating a deep slot in combination with a second main wall, having two major surfaces, stacked on top of the pair of side walls;
an opening in the first main wall, the opening extending longitudinally along the first main wall a relatively short distance;
a spring clip configured complimentarily to the opening and removably retainable therein; and
a spring fixedly connected to the spring clip.

2. A deep slot tape cartridge library module as claimed in claim 1 wherein the spring clip includes a pair of detents engagable with the opening.

3. A deep slot tape cartridge library module as claimed in claim 1 wherein the spring clip is overmolded on the spring.

4. A deep slot tape cartridge library module as claimed in claim 1 wherein the spring clip further includes a hole receptive to a tool to facilitate removal of the spring clip from the first main wall.

* * * * *